March 9, 1937.  F. MUHLENBRUCH  2,073,284
PROGRESSIVE CHANGE SPEED MECHANISM
Filed June 12, 1935  2 Sheets-Sheet 1

INVENTOR
FRED MUHLENBRUCH
BY
ATTORNEY

March 9, 1937.  F. MUHLENBRUCH  2,073,284
PROGRESSIVE CHANGE SPEED MECHANISM
Filed June 12, 1935  2 Sheets-Sheet 2
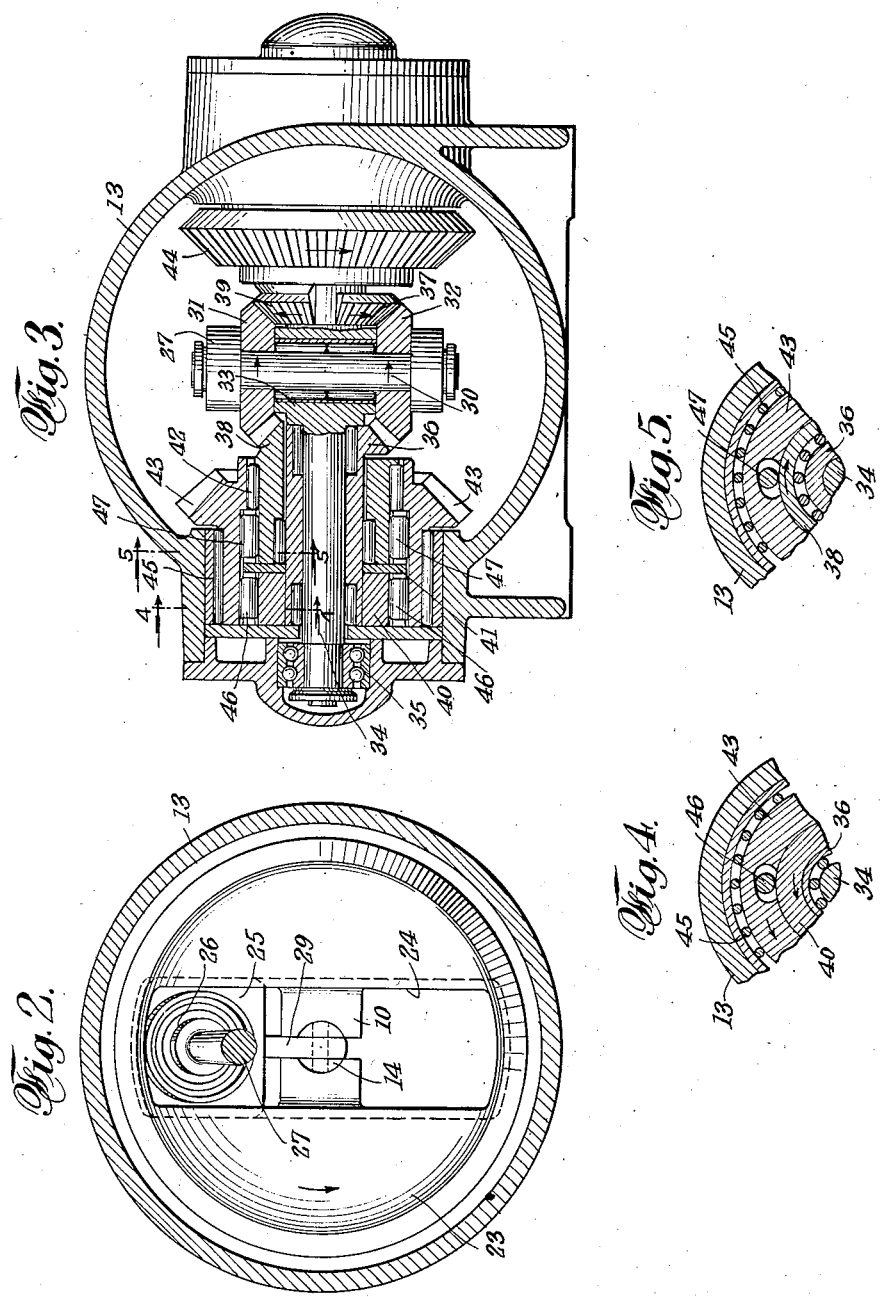
INVENTOR
FRED MUHLENBRUCH
BY
ATTORNEY Patented Mar. 9, 1937

2,073,284

UNITED STATES PATENT OFFICE 2,073,284

PROGRESSIVE CHANGE SPEED MECHANISM

Fred Muhlenbruch, New York, N. Y.

Application June 12, 1935, Serial No. 26,101

4 Claims. (Cl. 24—112)

This invention relates to mechanism for progressively varying the speed of a member driven by a constant speed member.

Although many attempts have been made to provide transmission means of this type, the major fault, among many others, lies in the irregular transmission of rotation from the driving to the driven shaft. This, of course, is undesirable since a uniform and constant speed is desired, especially when the mechanism is employed in the automotive and machine tool fields.

The invention therefore has for its major object the provision of mechanism for changing the speed of a driven shaft in relation to the speed of a driving shaft by the manipulation of a single actuator, said changes being capable of practically infinitesimal variations and not entailing meshing and unmeshing of change gears or the like.

Another object of the invention resides in the provision of gearing and clutch means for translating the rotary motion of a driving shaft to rotary motion of a driven shaft at varying speeds, the motion of said driven shaft being uniformly constant.

The foregoing and other objects of the invention and the means for their attainment are more clearly set forth in the following detailed specification, descriptive of the accompanying drawings in which are exemplified transmission mechanism as contemplated in this invention, and in which:—

Fig. 2 is a cross-sectional view as taken along the line 2—2 of Figure 1.

Fig. 3 is a similar view as taken along the line 3—3 of Figure 1.

Fig. 4 is a fragmentary sectional detail view on the line 4—4 of Figure 3.

Fig. 5 is a similar view on the line 5—5 of Figure 3.

Figure 1:
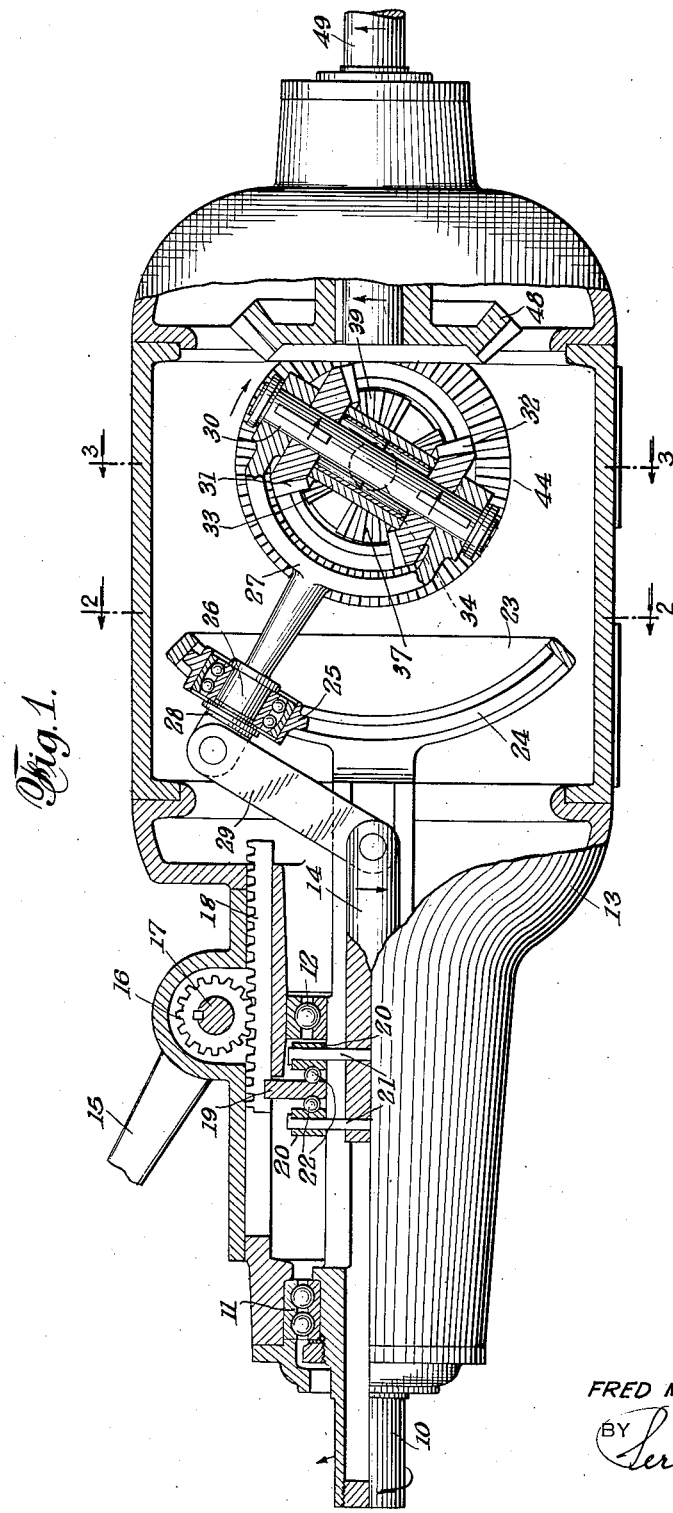
Fig. 1 is a partial elevational, partial longitudinal sectional view of a preferred form of transmission mechanism.

In the drawings, the drive member or shaft 10 is journaled at 11 and 12 in a suitable casing or housing 13. In the usual manner, these bearings 11 and 12 may be of the anti-friction type as shown.

In the present instance it is preferred to hollow the drive member 10 for the reception of a slidable shaft 14, said shaft being moved endwise by means such as the actuating handle 15. A preferred manner for accomplishing this movement of the shaft 14 is to provide a gear 16 secured to the pivot stud 17 of the handle, to mesh said gear with a rack 18, to engage said rack with a plate 19 confined between thrust plates 20—20, and to secure said thrust plates to the shaft 14 by means such as shown at 21. Since it is desired to maintain the plate 19 stationary and because the plates 20—20 rotate with the shaft 14 and drive member 10, anti-frictional thrust balls as shown at 22 may be employed.

The inner end of the drive member 10 is formed as a flywheel disc 23, preferably formed as part of a concave spherical member, and provided with a guide slot 24 for the movement of a head 25. This head has journalled therein the end 26 of a yoke or fork 27. The yoke 27 is provided at its free end with a swivel joint 28 and is pivotally connected by a link 29 to the inner end of the slide shaft 14.

The forked ends of the yoke 27 have fixed therein a stud 30 and fixed to the stud there are provided spaced bevel pinions 31 and 32, the central portion of the stud being carried by a bearing 33 in the mid-portion of a cross shaft 34 journalled at its ends as at 35.

Mounted in proper bearings on each end of the shaft 34 are mutilated bevel pinions 36 and 37, both meshing with the bevel pinion 32, and properly journalled on the hub portions of the pinions 36 and 37 are the respective mutilated bevel pinions 38 and 39, both in mesh with the pinion 31.

The hub portions of the pinions 36 and 37 each respectively protrude beyond the ends of the hubs of the pinions 38 and 39 and a collar 40 is fastened on the protruding portion of each of the mentioned longer hubs. Between each of these collars and the adjacent end of the respective hub of the shorter gears, is interposed a plate 41.

Mounted for rotation as at 42 on the hubs of the pinions 38 and 39 respectively, are bevel gears 43 and 44, said gears being also journalled in bearings 45 in the housing.

One way clutch rollers such as shown at 46 are positioned between the collars 40 and the hubs of the gears 43 and 44 and similarly there are provided clutch rollers 47 between the hubs of the gears 38 and the hubs of the gears 43 and 44.

Both gears 43 and 44 are meshed with a driven bevel gear 48 on the driven shaft 49.

In operation and assuming rotation of the drive member 10 as shown by the arrow, the disc 23 will rotate in a counterclockwise direction as seen in Figure 2. From the position shown in Figure 1, the end 26 of the yoke 27 will move down and towards the front, causing both an oscillation of the stud 30 on its own axis and a turning movement of said stud on the axis of the shaft 34. After 90° of movement of the disc 23, the yoke end will assume a position in line with the axis of the shaft 14, said end having described a quarter-circular path with the stud 30 eventually assuming a vertical position as seen in Figure 3. During this first portion of the movement of the yoke end, both pinions 31 and 32 will rock in the direction of the arrows, the pinion 31 imparting rotation to the mutilated pinions 38 and 39, and the pinion 32 imparting rotation to the mutilated pinions 36 and 37.

The rotation of the mutilated pinion 38 will be in the direction of the arrow (Figure 5), the rotation of the mutilated pinion 36 will be in the direction of the arrow (Figure 4), and the rotation of the mutilated pinions 37 and 39 will be in the directions of the arrows (Figure 3).

However, since the stud 30 not only rotates on its own axis but also turns about the axis of the shaft 34, the mutilated pinions 36 and 39 will have increased rotation and the rotation of the mutilated pinions 37 and 38 will be lessened by the mentioned turning of the stud 30 about the axis of the shaft 34.

It is during this rotation that the clutch rollers 46 effect a drive between the pinion 36 and the gear 43, and the pinion 37 and the gear 44, both in the direction to drive the gear 48 in the direction of the arrow as shown in Figure 1. Since the speed of the pinion 36 is, at that time, greater than the speed of the pinion 37, the pinion 36 will be driving, the clutch of the pinion 37 overrunning to permit this.

Continued rotation of the fork-end 26 in the assumed counter-clockwise direction will in the manner above described, successively cause the four clutch members to drive the gear 48, for, as the fork-end 26 moves down and towards the rear (as viewed in Figure 1) the rotation of the pinions 31 and 32 is reversed and the mutilated pinions 37 and 38 have the greater speed. At this time the clutch rollers 47 will effect a drive between the pinion 38 and the gear 43 in the same direction as heretofore. This continues for the second 90° of rotation of the fork-end 26. Successively, thereafter, the pinions 37 and 39 effect the drive from the gear 44 to the gear 48.

In the above manner a uniform speed is imparted to the gear 48 and so to the driven shaft 49, since all the 90° turns of the yoke are identical and since the operative gear trains effecting the drive are also identical.

As shown, the mechanism is set for the maximum speed of the driven shaft 49. Simple manipulation of the handle 15 to slide the shaft 14 and so bring the fork-end 26 nearer the center of the disc 23, will relatively reduce the speed of the driven shaft, since the gyrations of the yoke 27 are lessened, thereby lessening the rotation of the active gear train.

Zero rotation of the driving member may be attained by shifting the shaft 14 towards the left so the fork-end is in axial alignment therewith. There will be no gyrations of the fork in this position, the swivel 28 permitting rotation of the driving member 10 and the slidable shaft 14.

The invention as contemplated is capable of many changes and modifications, all falling within the spirit and scope of the invention as hereinafter claimed. Interpretation of the following claims, therefore, should be had on the prior art rather than on the present disclosure, which though preferred, is only exemplary of the invention.

What I claim as new and desire to secure by Letters Patent, is:

1. A progressive change speed mechanism comprising a driving member, a driven member, and means for driving said driven member from said driving member comprising a gyratory yoke having its free end connected to the driving member, pinion gear means on the forked ends of the yoke, mutilated gears in driving relation with the mentioned pinion gear means, gearing for driving the driven member, and plural clutch means successively operatively connecting the mutilated gears with the gearing for the driven member.

2. In a progressive change speed mechanism, means for imparting rotation from a driving member to a driven member comprising a yoke, a rotary portion on the driving member receptive of the free end of the yoke, a stud fixed in the forked ends of the yoke, pinion gear means fixed to the stud, a bearing for said stud, the axis of rotation of said bearing being transverse to the axis of rotation of the mentioned rotary portion of the driving member, mutilated gears in driving relation with the mentioned pinion gear means, gearing for driving the driven member, and plural clutch means successively operatively connecting the mutilated gears with the gearing for the driven member.

3. In a progressive change speed mechanism, a driving member, a driven member, a transverse shaft, a bearing in a mid-portion of said shaft, a stud in said bearing disposed at right angles to the transverse shaft, pinion gears fixed to said stud, a yoke having its forked ends also fixed to the stud, means on the driving member for gyrating the yoke, mutilated gears meshing with the pinion gears and coaxial with the transverse shaft, a pair of gears, a gear on the driven member meshing with the mentioned pair of gears, and plural clutch means each successively operatively connecting the mutilated gears and the pair of gears and thereby driving the gear on the driven member.

4. In a device of the character described, mutilated gears, a gyratory yoke having pinion gears fixed thereto and having a common axis, said pinion gears being in mesh with the mutilated gears, means for gyrating the yoke and thereby imparting to the pinion gears both a rotary oscillatory motion about the common axis of the pinion gears and a turning movement about the axis of the mutilated gears, transmission gearing, and clutch means operative between the mutilated gears and the transmission gearing for progressively translating the motion of the pinion gears into uniform rotary motion of the transmission gearing.

FRED MUHLENBRUCH.